United States Patent [19]

Ueyama et al.

[11] Patent Number: 4,770,404
[45] Date of Patent: Sep. 13, 1988

[54] METHOD AND DEVICE FOR LOADING AND UNLOADING A FILM ON AND OUT OF A ROTARY DRUM IN THE EXPOSURE/RECORDING APPARATUS

[75] Inventors: Tsutomu Ueyama, Yawata; Yoshito Koyama, Osaka; Koji Yao, Kyoto, all of Japan

[73] Assignee: Dainippon Screen Mfg. Co., Ltd., Japan

[21] Appl. No.: 62,118

[22] Filed: Jun. 12, 1987

[30] Foreign Application Priority Data

Jun. 13, 1986 [JP]  Japan ................................ 61-138478
Jan. 23, 1987 [JP]  Japan ................................ 62-15000

[51] Int. Cl.[4] ............................................. B65H 5/22
[52] U.S. Cl. ............................................. 271/5; 355/73; 271/11; 271/105; 271/276; 271/277
[58] Field of Search ................... 271/3, 3.1, 5, 11, 12, 271/14, 103, 105, 107, 112, 276, 277; 355/73, 76, 47

[56] References Cited

U.S. PATENT DOCUMENTS

| 3,870,518 | 3/1975 | Werner . | |
| 4,127,265 | 11/1978 | Wirz et al. | 271/276 |
| 4,358,100 | 11/1982 | Muller | 271/11 |
| 4,662,622 | 5/1987 | Wimmer et al. | 271/105 |
| 4,707,123 | 11/1987 | Ueyaka | 355/73 |

FOREIGN PATENT DOCUMENTS

| 52-42086 | 10/1977 | Japan . | |
| 55-041223 | 3/1980 | Japan | 355/73 |
| 60-232350 | 11/1985 | Japan | 271/11 |
| 61-166449 | 7/1986 | Japan | 271/11 |

Primary Examiner—H. Grant Skaggs
Attorney, Agent, or Firm—Ostrolenk, Faber, Gerb & Soffen

[57] ABSTRACT

Method and apparatus for loading an unexposed film on a rotary drum in a exposure/recording apparatus, such as raster plotter or a color scanner, and unloading the exposed film out of the drum, the replacement of films being automatically carried out by the use of a supply pallet and a discharge pallet, suckers, and maneuverable linkages so as to enable the film to travel from the supply pallet to the drum, and, after exposure, to the discharge pallet.

12 Claims, 7 Drawing Sheets

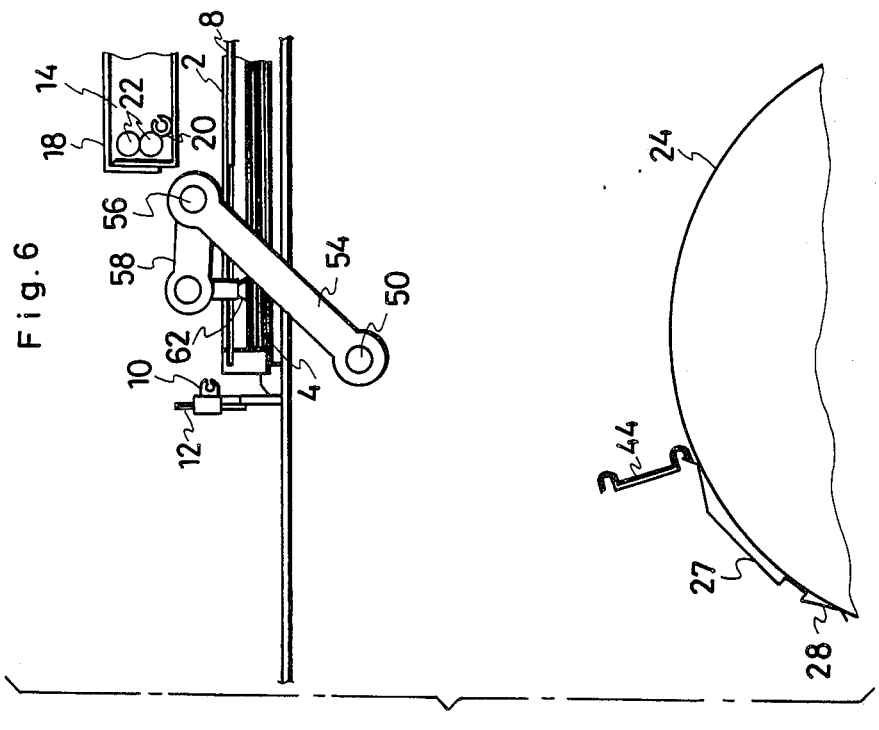
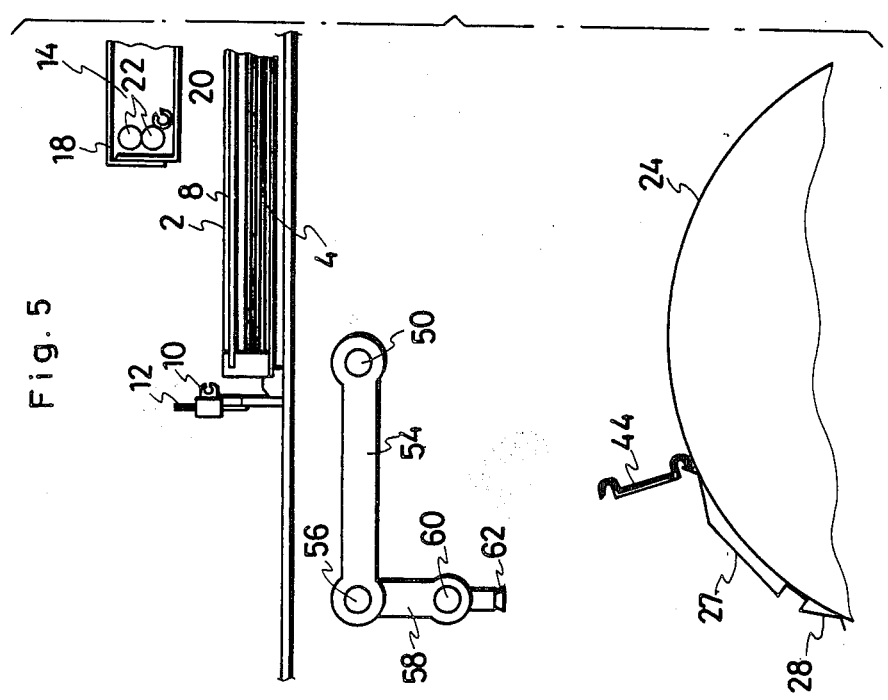

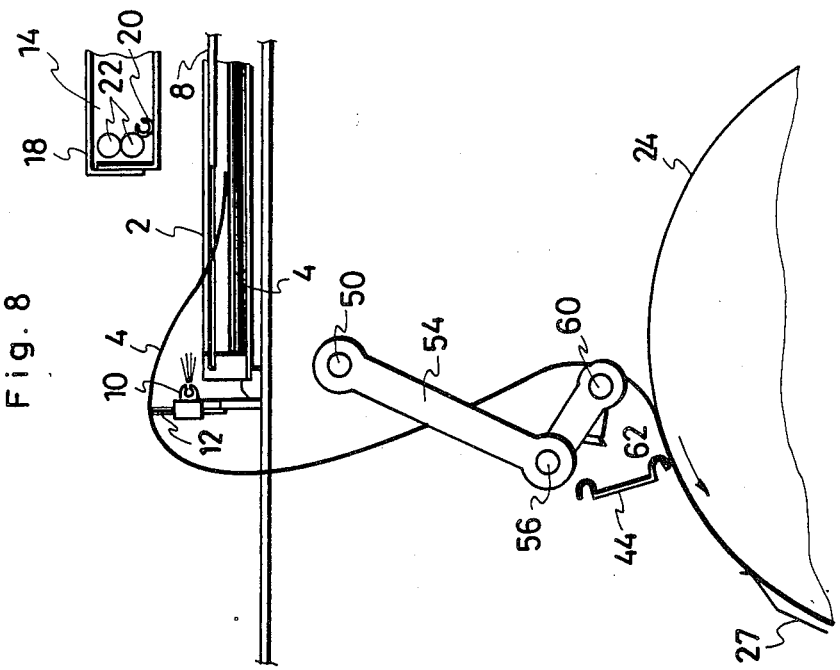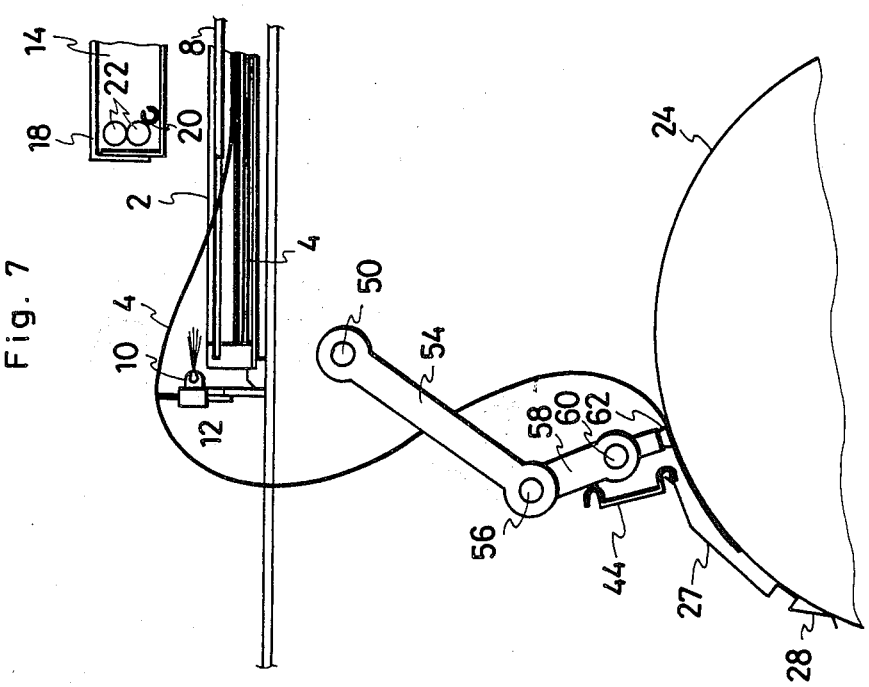

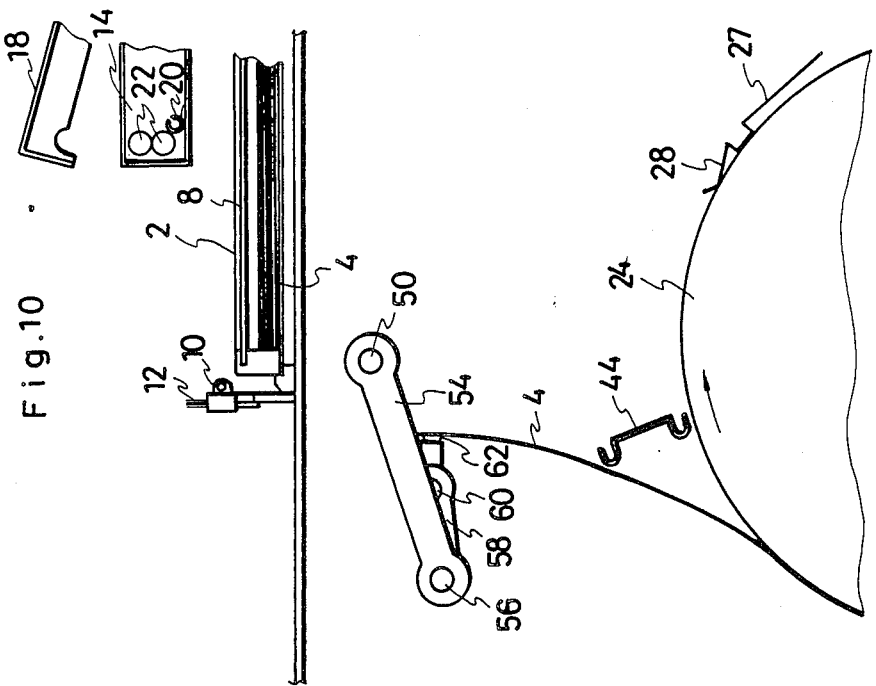
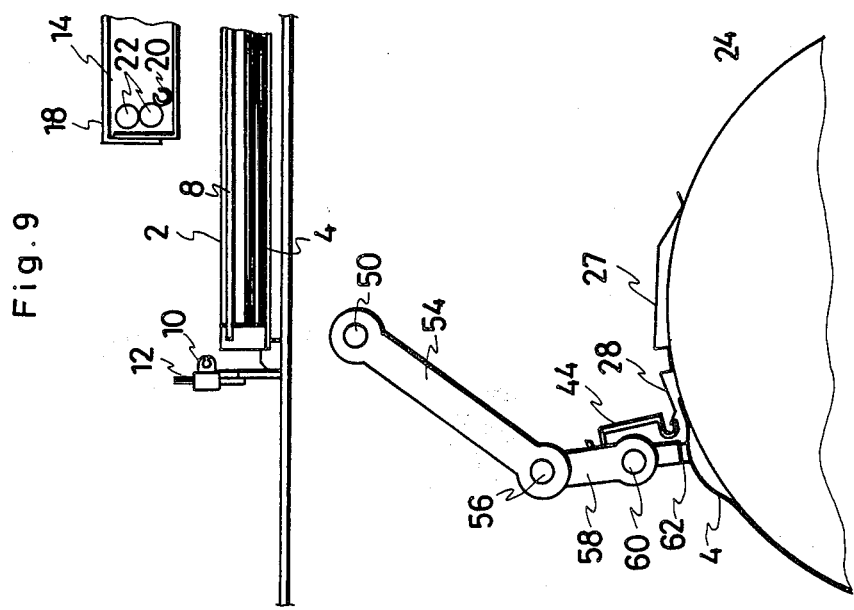

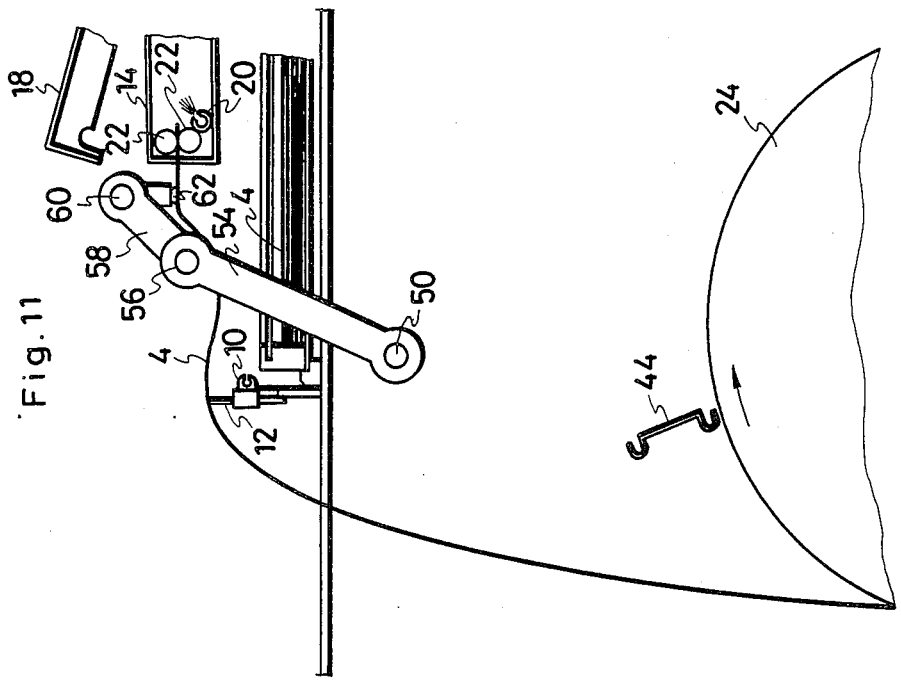

METHOD AND DEVICE FOR LOADING AND UNLOADING A FILM ON AND OUT OF A ROTARY DRUM IN THE EXPOSURE/RECORDING APPARATUS

BACKGROUND OF THE INVENTION

1. Field of the Invention

The present invention relates to method and device for loading and unloading a film onto and off of a rotary drum in exposure/recording apparatus, such as a raster plotter employed for defining wiring patterns of, e.g., printed wiring boards (PWBs), a precise exposure device for photomechanical process, which device controls exposure beams in an on-off manner as a function of supplied dot pattern data to perform main scanning and vertical scanning thereby to print desired patterns on photosensitive material, and a color scanner for use in graphic arts.

2. Description of the Prior Art

To automatically load and unload a film onto and off of a rotary drum in an exposure/recording apparatus, there are many expedients known in the art, among which is an apparatus disclosed in Japanese Patent Publication (examined) No. 52(1977)-42086. This known apparatus achieves the automatic loading and unloading of a film by employing a cassette in which the film is accommodated. A disadvantage of this apparatus is that the film is the cassette must be replaced with a fresh film every time the exposure is finished. The replacement of films must be carried out in a darkroom separated from the operation room. To reduce the inefficiency resulting from the frequent replacement two cassettes are used, that is, one cassette is used for the scanning operation while the other one is used for the replacement the films. In any case, however, the frequent replacement of films is labor- and time-consuming, thereby leading to the increased production cost.

OBJECTS AND SUMMARY OF THE INVENTION

A primary object of the present invention is to solve the foregoing problems in the known methods and apparatus for loading and unloading a film, and to provide a system capable of quick replacement of films one after another automatically.

Another object of the present invention is to provide a system for replacement of films, having a simplified and compact structure.

Other objects and advantages of the present invention will become more apparent from the following detailed description, when taken in conjunction with the accompanying drawings which show, for the purpose of illustration only, one embodiment in accordance with the present invention.

According to one aspect of the present invention there is provided a device for loading and unloading a film onto and off of a rotary drum in an exposure/recording apparatus, the device comprising; a rotary drum having a plurality of pores in its peripheral surface so that a vacuum pressure may be passed therethrough; a blade for pressing an end of the film to the drum surface; a supply section for accommodating several sheets of pre-exposed film; a discharge section for discharging an exposed film; a driving means for rotating the rotary drum; a first shaft pivotally connected to the body of the apparatus, and a first arm rotatable synchronously with the first shaft; a second shaft pivotally connected to the first arm, and a second arm rotatable synchronously with the second shaft; a third shaft pivotally connected to the second arm; a plurality of suckers fixed to the third shaft so that they are rotatable in accordance with the rotation of the third saft; and a driving means for rotating each shaft so that the respective arms and the suckers travel to and from the film supply section, the drum surface and the film discharge section, in a manner which effects the automatic loading and unloading of the film on and out of the rotary drum for exposure.

According to another aspect of the present invention, there is provided a device for loading and unloading a film onto and off of a rotary drum in an exposure/recording apparatus, the device comprising: a rotary drum having a plurality of pores in its peripheral surface so that a vacuum may be passes therethrough; the rotary drum provided with a blade for pressing one end of the film to the drum surface; a supply section for accommodating several sheets of non-exposed film; a discharge section for discharging an exposed film; driving means for rotating the rotary drum; an articulated transfer mechanism having a plurality of shafts and connecting arms and a plurality of suction cups for grabbing and releasing film located in said supply section, said discharge section and said rotary drum; and driving means for controlling the articulated transfer mechanism in a manner which causes the suction cups to alternatively grap and release a film and move it from the supply section to the rotary drum before the film is exposed and from the rotary drum to the discharge section after the film is exposed in a manner which effects the automatic loading and unloading of the film onto and off of the rotary drum for exposure.

According to another aspect of the present invention, there is provided a method for loading and unloading a film onto and off of a rotary drum in an exposure/recording apparatus, the method comprising the steps of: conveying a first end portion of a film to the drum surface using a sucking pressure; inserting the film first end in between the drum surface and a first holder located adjacent to the drum surface so as to secure it thereto temporarily; releasing the film first end from the sucking pressure; rotating with the film secured thereon and a vacuum provided therethrough, thereby winding the film around the drum; inserting the second end of the film in between the drum surface and a second holder located adjacent to the drum surface using a sucking pressure; releasing the second end of the film from the sucking pressure and securing it by the second holder; releasing the first end of the film from the first holder so as to make it free from the drum surface; and raising the first end of the film under suction away from the drum surface; releasing the first end of the film from the suction, and securing it to the drum surface by the first holder.

BRIEF DESCRIPTION OF THE DRAWINGS

FIGS. 5 to 13 show various aspects of the operation.

DETAILED DESCRIPTION OF THE PREFERRED EMBODIMENT

Figure 1:
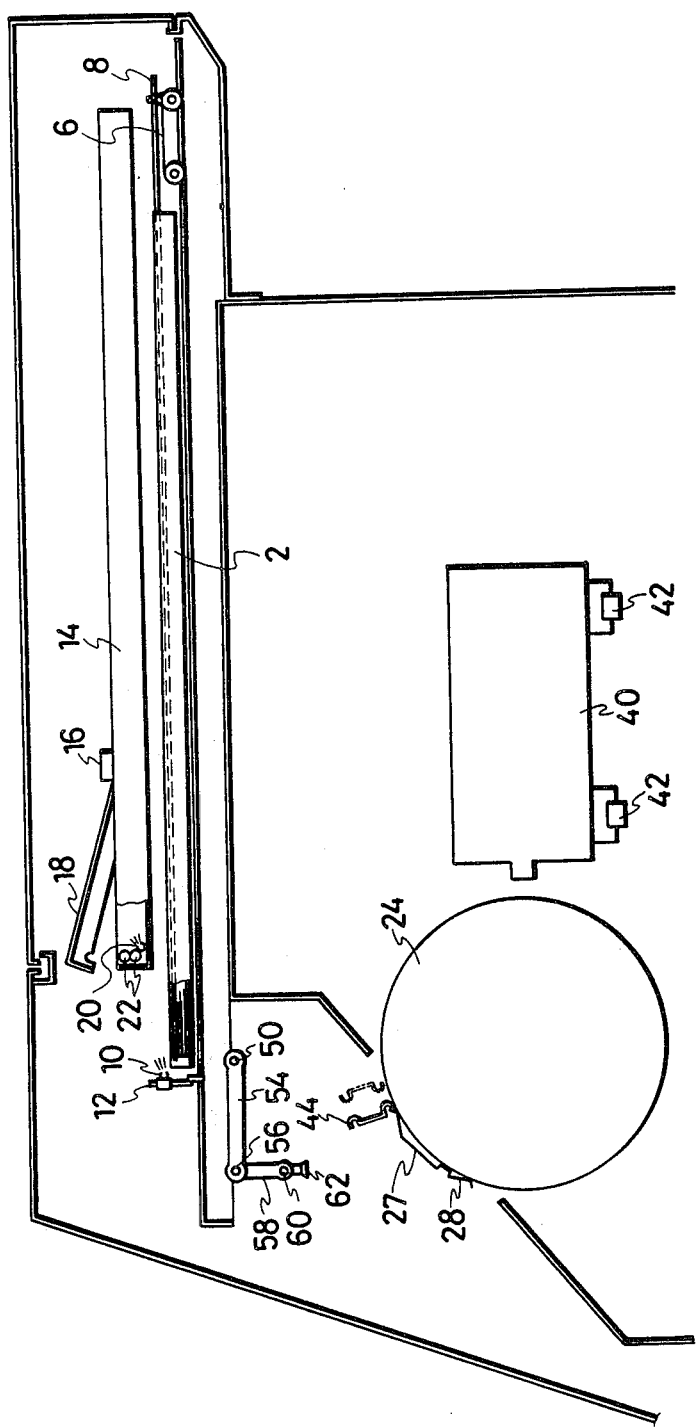
FIG. 1 is a diagrammatic side view showing a main part of a raster plotter employing a device embodying the present invention.
Figure 2:
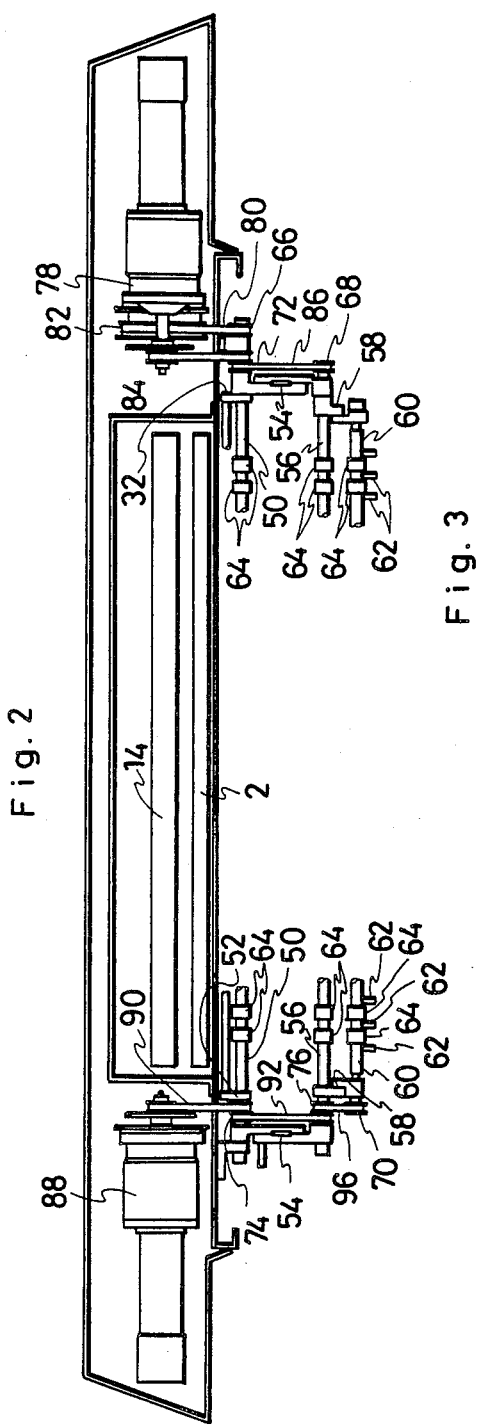
FIG. 2 is a front view showing the raster plotter of FIG. 1.

Referring to FIGS. 1 and 2 the raster plotter includes a supply pallet 2 in which several sheets of pre-exposed film 4 (FIG. 5) are accommodated in layers. The pallet 2 is closed by a cover 8 which is movable by means of a timing belt driven by a motor (not shown). The reference numerals 10 and 12 denote an air jet nozzle and an anti-electrostatic carbon brush, respectively, which are located at the top end of the pallet 2.

There is provided a second pallet 14 for discharging exposed films, which will be referred to as the "discharge pallet" in contrast to the supply pallet 2. The discharge pallet 14 is provided with a lid 18 hinged thereto so as to be opened and closed by a solenoid 16. The discharge pallet 14 is also provided with an air jet nozzle 20, and a pair of rollers 22 connected to a motor (not shown) through a known ratchet mechanism.

Figure 3:
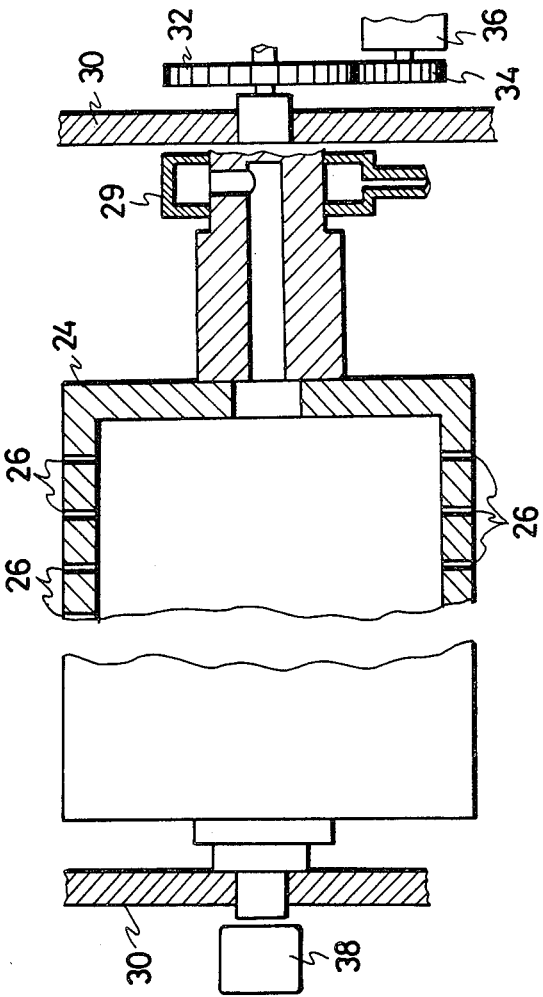
FIG. 3 is a partly broken front view showing the rotary drum shown in FIG. 1.

The reference numeral 24 denotes a rotary drum around which the film 4 is wound, the wound film 4 being exposed and scanned while the drum 24 is in rotation. Opposte ends of the film 4 on the drum are secured to the drum surface by blades 27 and 28, respectively as shown in FIG. 3 the rotary drum 24 is a hollow structure, and is provided with a plurality of pores 26 through which a vacuum pressure is passed so as to attract the film 4 from underneath. The pores 26 are connected to a blower (not shown) through a rotary valve 29. The drum 24 has a shaft passing through bearings 30 and extending outward. The drum shaft is provided with gears 32 and 34 connected to a motor 36 at one end, and an encoder 38 at the other end. The gears 32 and 34 are used to reduce the rotational speed of the drum 24 when the film 4 is loaded or unloaded. The encoder 38 is used to detect an angular displacement of the drum 24; more specifically, it generates a number of pulses corresponding to the amount of angular displacement of the drum 24 with respect to a predetermined reference value. By counting the number of pulses, the drum 24 is rotated for a desired angular amount or stopped at a desired position.

Referring again to FIG. 1, the film 4 placed on the drum 24 is exposed by a lighting head 40 which is movable on rails 42 by axially power with the drum 24; that is, in a direction perpendicular to the paper of the drawing.

Figure 4:
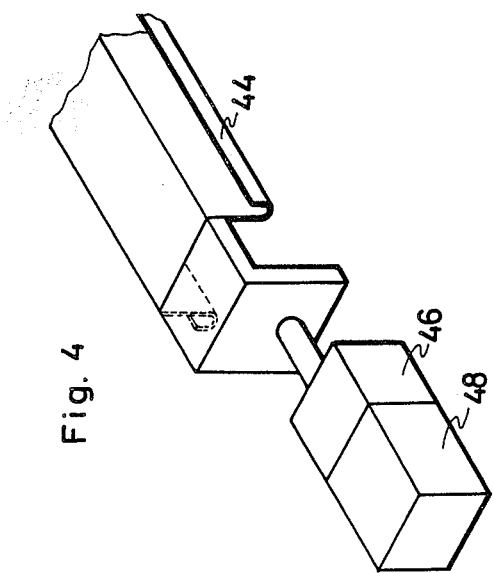
FIG. 4 is a fragmentary perspective view showing the blade lifter shown in FIG. 1.

The blades 27 and 28 are raised by a blade lifter 44 when the film ends are released from the drum surface. As best shown in FIG. 4, the lifter 44 is supported by gear boxes 46 at its opposite ends, each gear box being connected to a motor 48 secured to the body of the device. The lifter rotates between the positions indicated by the solid lines and dotted lines in FIG. 1.

Now, referring to FIGS. 1 and 2 a maneuverable mechanism will be described, which effects the travel of the film 4 from the supply pallet 2 to the drum surface, and then to the discharge pallet 14:

There are provided a first shaft 50 and a second shaft 56. The first shaft 50 is supported by the body of the device through a bearing section 52, and provided with first arms 54 at opposite ends. The second shaft 56 is pivotally connected to the first arms 54 at its opposite ends, and additionally connected to second arms 58 at opposite ends. There is provided a third shaft 60 pivotally connected to the second arm 58 at opposite ends. This third shaft is provided with a plurality of suckets or suction cups 62. Each shaft 50, 56 and 60 is provided with rollers 64.

The reference numerals 66, 68 and 70 denote a pulley fixed to each end of the shafts 50, 56 and 60, respectively which pulleys rotate synchronously with the respective shafts 50, 56 and 60. The reference numerals 72, 74 and 76 denote pulleys provided on the first shaft 50 (or the second shaft 56), each of which pulleys rotates independently of the rotation of the respective shafts. The pulley 66 is connected to a first motor 78 through a belt 80, and rotates the first shaft 50. The pulleys 68 is connected to a second motor 82 through belts 84, 86 and a pulley 72, and rotates the second shaft 56. The pulley 70 is connected to a third motor 88 through belts 90, 92, 96 and pulleys 74, 76, and rotates the third shaft 60. The rotation of the shafts 50, 56 and 60 initiates the angular movement of the arms 54, 58 and the suckers 62.

A typical example of the operation will be described with reference to FIGS. 5 to 11:

In the initial (pre-operation) state shown in FIG. 5 the supply pallet 2 and the discharge pallet 14 are fully closed by the cover 8 and the lid 18, respectively. The suckers 62 and the rotary drum 24 are ready to operate.

In this state the film loading operation is started. First the cover 8 is withdrawn by driving the belt 6. Then the motors 78, 82 and 88 are driven to move the arms 54, 58 and the suckers 62 until the suckers 62 come into contact with the first sheet of film 4 in the supply pallet 2 as shown in FIG. 6. In this way the film 4 is caught by the suckers 62 under suction. At this stage the suckers 62 are caused to ascend, and at the same time an air jet is blown to the film 4 through the nozzle 10 so as to facilitate the separation of the first layer from the stock remaining in the supply pallet 2.

The suckers 62 are moved up to the position shown in FIG. 7, thereby transporting the film 4 onto the drum 24. At this moment the motor 48 (FIG. 4) is started to rotate the blade lifter 44 to raise the blade 27 and insert the film 2 in between the blade tiop and the drum surface. The blade lifter 44 is then returned to the position shown in FIG. 5, and the starting end of the film 4 is pressed to the drum surface by the blade 27.

While the starting end of the film 4 is secured to the drum surface by the blade 27, the film is released from the pressure provided by the suckers 62, which are then moved up to the position shown in FIG. 8. In turn, the film 4 is subjected to the pressure through the pores 26 in the drum 24. The drum 24 is rotated in the direction of arrow in FIG. 8 at a reduced speed by the motor 36. The film 4 is placed on the drum surface under the guidance of the rollers 64 (FIG. 2), in the course of which the undersurface of the film keeps contact with the carbon brush 12, thereby removing the electrostatic charge at rest thereon.

When the film 4 has been wound around the drum 24, the suckers 62 are used to suck the terminating end of the film 4 as shown in FIG. 9 and inserts it between the drum surface and the blade 28. At this moment the blade lifter 44 rotates at about 180° from the state shown in FIG. 7, and raises the blade 28. At the same time the supply pallet 2 is closed by the cover 8 by driving the belt 6.

When the film 4 is loaded on the drum 24, the suckers 62 return to their original positions shown in FIG. 5. The blade lifter 44 is withdrawn up to the position free from the blades 27, 28. Then the drum 24 rotates at an increased speed, and the film 4 on the drum 24 is subjected to exposure by the lighting head 40.

After the exposure has been finished the suckers 62 are again moved to the position shown in FIG. 9 to suck the terminating end of the film 4. The blade lifter 44 is raised as described above.

Then the suckers 62 are caused to ascend as shown in FIG. 10, and the drum 24 is rotated at a reduced speed in the direction of arrow. The solenoid 16 is driven to open the lid 18 for the discharge pallet 14.

The suckers 62 are further moved until the terminating end of the film caught by the suckers 62 under pressure is inserted in between the rollers 22 of the discharge pallet 14. Then the film 4 is released from the suckers 62. Once the film has been inserted in between the rollers 22 it is unlikely to become separated from the rollers 22 owing to the ratchet mechanism.

The rotation of the rollers 22 and the drum 24 enables the film 4 to enter the discharge pallet 14. At this stage a high pressure is applied to the film 4 through the air jet nozzle 20, thereby facilitating the movement of the film 4 within the discharge pallet 14. When the film 4 is completely accommodated in the discharge pallet 14, the pallet is closed by the lid 18 in response to energizing the solenoid 16, and the suckers 62 are returned to the position shown in FIG. 5. In this way the unloading of the exposed film 4 is finished.

In the example described above the discharge pallet 14 is employed but instead of it a belt conveyor can be employed. The blade lifter 44 can be omitted, and instead it can be arranged that the end portions of the film may be force into between the blade tip and the drum surface. The blades 27, 28 may be not necessarily intended to press the film ends onto the drum surface but may be intended to cover the film end against a possible external pressure, such as wind, wherein, however, it is preferred to ensure that the film ends are secured to the drum surface, for example, by increasing the vacuum at the spots where the film ends are in contact with the drum surface.

As described above the use of the blade lifter 44 is not essential for loading the film 4 on the drum 24, and without it the loading of film can be automatically effected under the above-mentioned arrangement. When the film ends are strongly pressed to the drum surface by the blades 27, 28, a distortion of some tens of microns order may often occur in the exposed image.

The reason for this is as follows:

The film starting end is forced into between the blades 27 (28) and the drum surface while the film end is being caught by the suckers 62. Under this condition it is unavoidable that the film end becomes slightly slack, which means that the film end has a strain due to the slack condition. The exposure is carried out on the film having the slack part. This causes a distortion around the image.

In order to place the film 4 on the drum 24 without causing strain in the film ends it is preferred that the film ends are inserted in between the drum surface and the blade 27 (28) with releasing the film from the pressure by the suckers 62.

Figure 12:
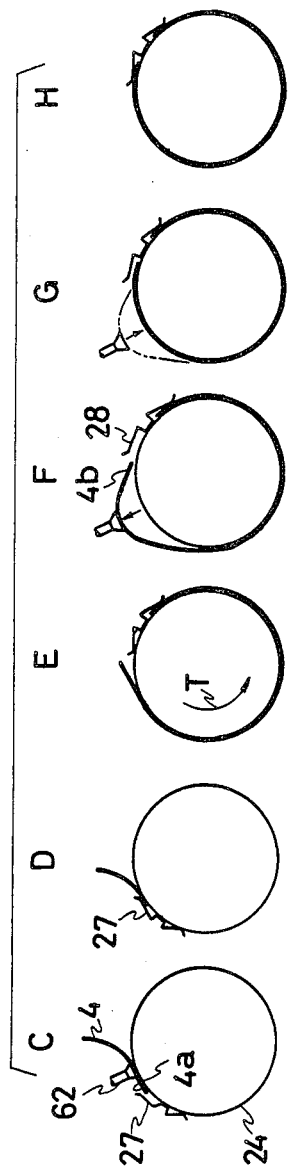
Figure 13:
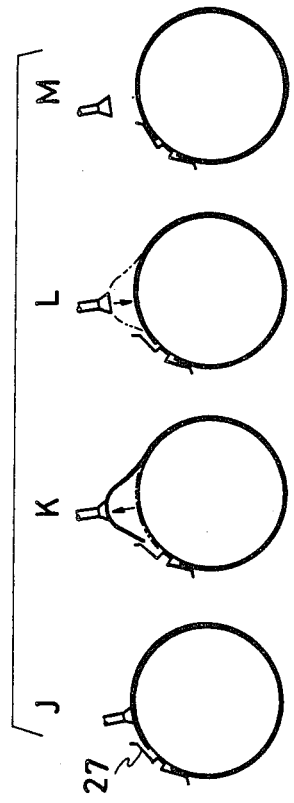

An example of the operation of the method according to the present invention will be now described:

Referring to FIGS. 12 and 13 the suckers 62 hold the film starting end 4a under pressure and convey it to the drum 24. At this stage the blade lifter 44 raises the blade 27 so as to place the film end 4a in between the drum surface and the blade 27 (FIG. 12C). The blade lifter 44 returns to its original position. In this way the film end 4a is secured to the drum surface (FIG. 12D).

The film end 4a is then released from the suckers 62, and while it is being subjected to the vacuum given through the pores 26 in the drum 24, the drum 24 is rotated at a reduced speed in the (T) direction in FIG. 12E. In this way the film 4 is wound around the drum 24.

After the film is wound around the drum the drum 24 is stopped from rotation, and the terminating end 4b of the film 4 is caught by the suckers 62 under pressure and conveyed into between the drum surface and the blade 28 (FIG. 12F), which has been previously raised by the blade lifter 44.

Then the film end 4b is released from the suckers 62, and secured to the drum surface due to the vacuum applied through the pores 26 in the drum 24 (FIG. 12G).

The blade 27 is raised to release the film starting end 4a (FIG. 13J), which is raised by the suckers 62 under pressure and is kept away from the drum surface (FIG. 13K). Then the film end 4a is released from the suckers 62, and in turn subjected to the suction through the pores 26 in the drum 24 for withdrawal from the drum surface (FIG. 13L). During this movement of the film end 4a the strain therein is removed. Again, the film end 4a is secured to the drum surface by the blade 27 (FIG. 13M).

In this way the film 4 is placed on the drum 24 without any strain due to slackening.

As is evident from the foregoing description the layers of film stored in the supply pallet 2 are transported to and wound around the rotary drum 24 for exposure, and the exposed films are transported to the discharge pallet 14. The travel of films is automatically carried out. The maneuvering system is simplified and compact because of the employment of the first, second and third shafts rotatable independently of one another.

The film 4 is wound around the drum 24 without causing strains in the end portions, thereby eliminating the danger of having a distorted image which otherwise would be likely to occur.

What is claimed is:

1. A device for loading and unloading a film onto and off of a rotary drum which forms part of an exposure/recording apparatus, the device comprising:
    a rotary drum having a plurality of pores in its peripheral surface so that a vacuum pressure may be passed therethrough;
    the rotary drum being provided with a blade for pressing one end of the film to the drum surface;
    a supply section for accommodating several sheets of non-exposed film;
    a discharge section for discharging an exposed film;
    driving means for rotating the rotary drum;
    a first shaft pivotally connected to the body of the apparatus, and a first arm rotatable synchronously with the first shaft;
    a second shaft pivotally connected to the first arm, and a second arm rotatable synchronously with the second shaft;
    a third shaft pivotally connected to the second arm;
    a plurality of suckers fixed to the third shaft so that they are rotatable in accordance with the rotation of the third shaft; and
    driving means for rotating each shaft so that the respective arms and the suckers travel to and from the film supply section, the drum surface and the film discharge section, in a manner which effects the automatic loading and unloading of the film onto and off of the rotary drum for exposure.

2. A device as set forth in claim 1, further comprising means for opening and closing the blade with respect to the drum surface.

3. A device as set forth in claim 2, wherein the opening and closing means is located adjacent to the periphery of the rotary drum.

4. A device as set forth in claim 1, wherein the supply section and the discharge section are located one above another.

5. A device as set forth in claim 1, wherein the supply section comprises a cover and means for opening and closing the cover.

6. A device as set forth in claim 1, further comprising an air jet nozzle located adjacent to an outlet of the supply section so that high pressure air is applied to the undersurface of a film to be taken out of the supply section, thereby facilitating the separation of a supply film from the stock remaining in the supply section.

7. A device as set forth in claim 1, wherein the discharge section comprises an air jet nozzle located adjacent to the inlet thereof so that high pressure air is applied to the undersurface of the film entering the discharge section, thereby facilitating the introduction of the film into the discharge section.

8. A device as set forth in claim 1, wherein at least one of the first, second and third shafts include film guide rollers rotatable about it.

9. A device as set forth in claim 1, further including means for applying a vacuum pressure through the pores of the rotary drum.

10. A device as set forth in claim 1, wherein said drive means rotates said rotary drum at a first speed when the film is being exposed and at a second, slower speed when the film is loaded onto the rotary drum.

11. A method for loading and unloading a film onto and off of a rotary drum which forms part of an exposure/recording apparatus, the method comprising the steps of:
grabbing a film using suction and conveying a first end of the film to the drum surface;
inserting the film first end in between the drum surface and a first holder located adjacent to the drum surface so as to secure it thereto temporarily;
releasing the film first end from the suction;
rotating the drum with the film secured thereon and with a vacuum being provided therethrough, thereby winding the film around the drum;
grabbing a second end of the film using suction and inserting the second end of the film between the drum surface and a second holder located adjacent to the drum surface;
releasing the second end of the film from the suction and securing it by the second holder;
releasing the first end of the film from the first holder so as to release it from the drum surface;
grabbing the first end of the film with suction and raising the first end of the film away from the drum surface; and
releasing the first end of the film from the suction, and depositing the film in a discharge section.

12. A device for loading and unloading a film onto and off of a rotary drum in an exposure/recording apparatus, the device comprising:
a rotary drum having a plurality of pores in its peripheral surface so that a vacuum may be passes therethrough;
the rotary drum provided with a blade for pressing one end of the film to the drum surface;
a supply section for accommodating several sheets of non-exposed film;
a discharge section for discharging an exposed film;
driving means for rotating the rotary drum;
an articulated transfer mechanism having a plurality of shafts and connecting arms and a plurality of suction cups for grabbing and releasing film located in said supply section, said discharge section and said rotary drum; and
driving means for controlling the articulated transfer mechanism in a manner which causes the suction cups to alternatively grab and release a film and move it from the supply section to the rotary drum before the film is exposed and from the rotary drum to the discharge section after the film is exposed in a manner which effects the automatic loading and unloading of the film onto and off of the rotary drum for exposure.

* * * * *